C. S. SAYRE.
LAWN MOWER SHARPENER.
APPLICATION FILED MAR. 10, 1916.

1,271,778.

Patented July 9, 1918.
2 SHEETS—SHEET 1.

WITNESSES

INVENTOR
Charles S. Sayre.

BY

ATTORNEY

C. S. SAYRE.
LAWN MOWER SHARPENER.
APPLICATION FILED MAR. 10, 1916.
1,271,778.
Patented July 9, 1918.
2 SHEETS—SHEET 2.
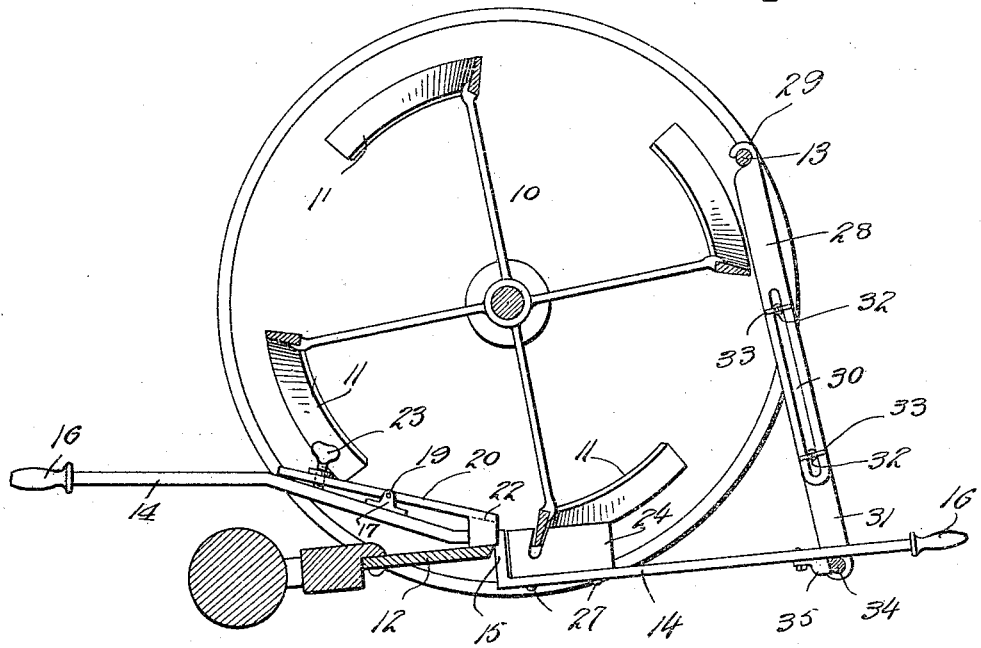
Fig. 2.
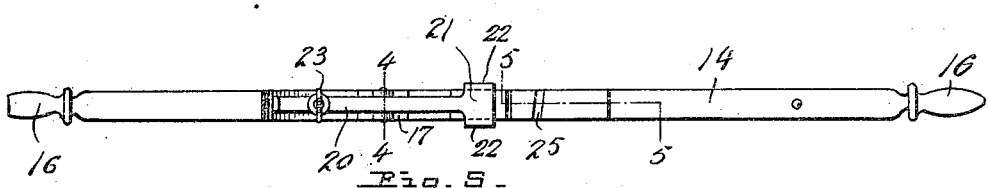
Fig. 3.
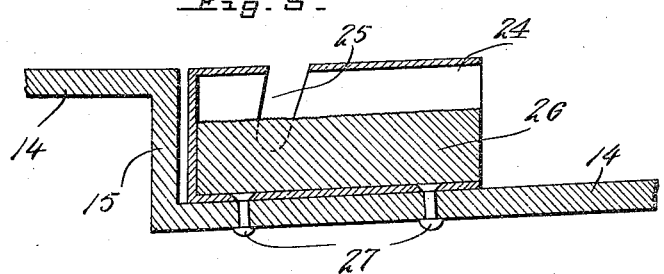

UNITED STATES PATENT OFFICE.

CHARLES S. SAYRE, OF ALBION, WISCONSIN.

LAWN-MOWER SHARPENER.

1,271,778.  Specification of Letters Patent.  Patented July 9, 1918.

Application filed March 10, 1916. Serial No. 83,362.

*To all whom it may concern:*

Be it known that I, CHARLES S. SAYRE, a citizen of the United States, residing at Albion, in the county of Dane and State of Wisconsin, have invented certain new and useful Improvements in Lawn-Mower Sharpeners, of which the following is a specification.

This invention relates to sharpening devices and more particularly to that class of sharpening devices that are especially designed for use in connection with lawn mowers.

The invention aims primarily to provide means whereby the several mower blades may be sharpened to have their cutting edge of a configuration complementary to that of the cutting edge of the bed knife, that is to say, in the event that the cutting edge of the bed knife is slightly distorted or out of line, the blade will be permitted to have the opposite or complementary formation so as to properly coöperate with the bed knife.

It further contemplates the provision of a device of the aforesaid character that utilizes the cutting edge of the bed knife of the mower as a guide whereby its adjustment with respect to the mower blade during the sharpening operation will be entirely automatic.

A further object of the invention is to provide a device of the above nature that may be efficiently used in connection with various types of lawn mowers, that is, in connection with mowers having either straight or spiral blades.

A still further object of my invention is to provide a device of the type in question that is extremely simple in construction, strong and durable, and highly practical from both the standpoint of the manufacturer and the standpoint of the user; and, which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—

Fig. 2 is a view in cross section of the body of the mower, showing my invention in side elevation and as in operative relation to the same;

Fig. 3 is a view in plan of the body of my improved sharpening device;

Fig. 5 is a view taken on line 5—5 of Fig. 3.

Figure 1:
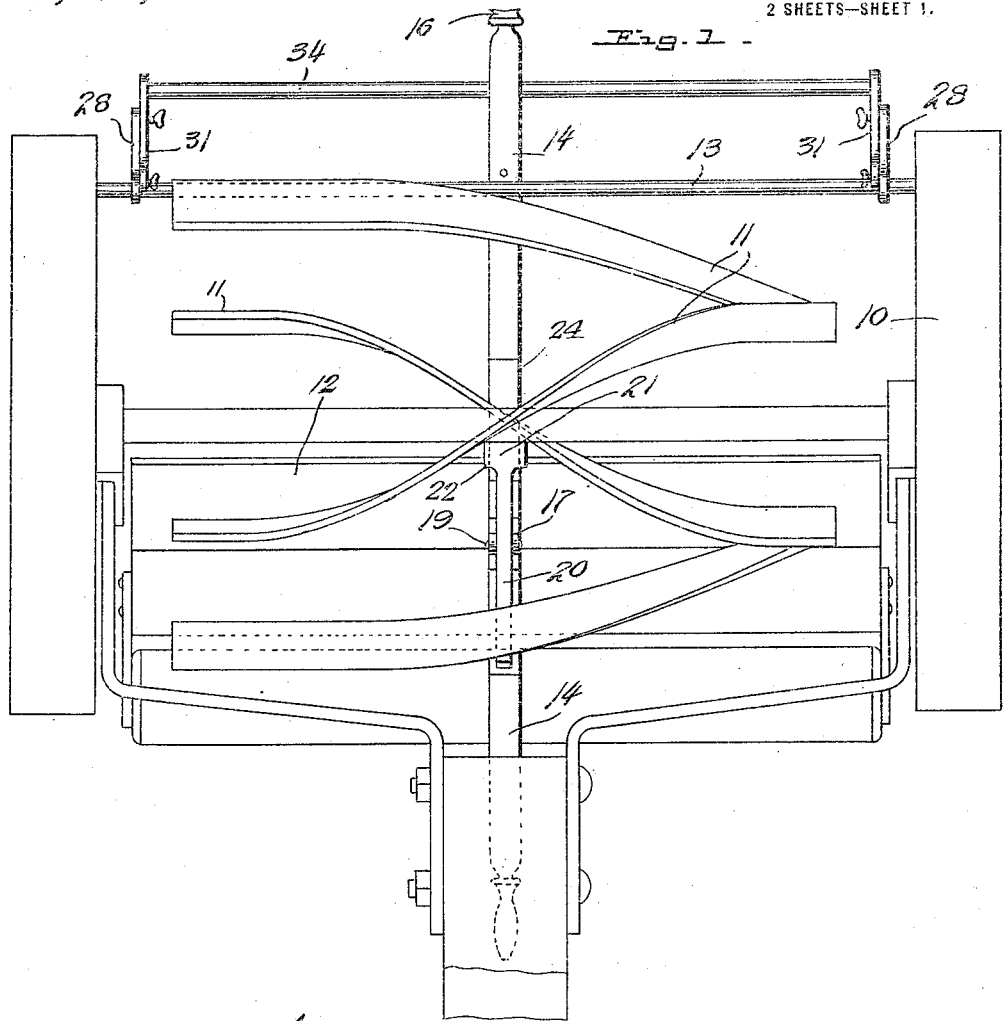
Figure 1 is a view in plan of a lawn mower of conventional form showing my invention as in operative relation therewith.

In the drawings, 10 designates an ordinary lawn mower including the usual mower blades 11, bed knife 12, and lateral brace rod 13.

My improved sharpening device consists generally of a body member or bar 14 that is preferably formed of an elongated strip of metal and offset intermediate its ends to provide a shoulder or guide 15 to serve the purpose presently appearing. At its ends, the body member 14 may be provided with hand grips 16 whereby it may be operated with ease.

Figure 4:
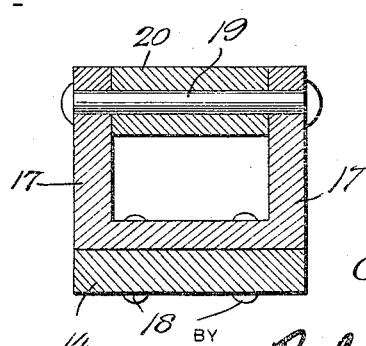
Fig. 4 is a cross sectional view taken on line 4—4 of Fig. 3.

Adjacent to the guiding portion 15, body member 14 carries suitable bearings 17, secured to the body 14 by rivets 18, said bearings being connected through the instrumentality of a pintle 19, as clearly shown in Fig. 4. Adjusting lever 20 operates upon pintle 19 as a pivot whereby it may be rocked with respect to the body member 14, according to the desire of the operator. Adjusting lever 20 carries a head 21 that provides spaced legs 22 to operate at each side of body member 14, while at its other end, said adjusting lever carries an adjusting screw 23 whereby it may be properly rocked upon pintle 19 to cause relative adjustment of body member 14. The screw 23 is in screw-threaded engagement with the lever 20, and its lower end bears upon the bar 14, so that by turning said screw, the contiguous end of the lever 20 is raised while the legs 22 are lowered against the top surface of the knife 12; and, by continuing to turn the screw 23, the bar 14 is adjusted relative to the knife 12.

Body member 14 further carries a file box 24 whose cut away portion 25 receives a portion of the respective mower blades and constitute a guide therefor as shown in Fig. 2, while said box also accommodates a file or abrasive member 26, as clearly shown in Fig. 5. Suitable means as shown at 27 may be employed for the purpose of fixedly securing file box 24 in position, but this is merely arbitrary. By reason of the construction shown in Fig. 5, it is obvious that file member 26 may be readily removed or replaced with respect to the file box 24 and also be securely held in position during sharpening operation. The file box shown may be formed of relatively thin sheet metal or of any other desired material.

In order to properly support body member 14, during sharpening operation, such as will be hereinafter described, I provide carrying arms 28, whose hook portions 29 rest on brace rod 13 of the mower, the said arms being provided adjacent their free ends with longitudinal slots 30 as shown in Fig. 2. Other carrying arms 31 are designed to coöperate with arms 28 and carry studs 32 which are passed through slots 30 of arms 28 and have adjustable nuts 33 whereby they may be held in rigid relation to arms 28. At their free ends, arms 31 are connected by a guide rod 34 upon which one end portion of body member 14 travels during the operation of the device; said body member being provided with a bearing portion or guide element 35 to operate on or rather bear against said rods as clearly shown in Fig. 2.

The operation of my invention is substantially as follows:—

The parts are first arranged in the position shown in Fig. 2, the arms 31 being adjusted to the desired degree, while lever 20 may be adjusted by means of member 23 in order to bring file box 24 in proper relation to the mower blades to be sharpened. When the parts have been so adjusted; the operator grasps the hand grips 16 and proceeds to move body member as well as the parts carried thereby, reciprocally along bed knife 12 and guide rod 34 so as to effect proper sharpening of the respective blades. Consequently, if the bed knife 12 should be slightly distorted at a point, the bearing portion 15 of body member 14 will be slightly lowered at that point, so as to cause the blade being sharpened to be slightly offset opposite to the distorted point of the bed-knife. Thus provision is made to obtain proper coöperation between the bed knife and the respective cutting blades after they have been sharpened. On the other hand, should the bed knife be slightly offset, the body member would be raised and the respective blades slightly cut away in order to receive the same during operation. By adjusting member 23, lever 20 may be moved so as to effect the raising or lowering of body member 14, guide rod 34 in this instance serving as the fulcrum.

From the foregoing, it is believed that the advantages and novel features of my invention will be readily understood and, therefore, further detail description is deemed unnecessary.

In reducing my invention to practice, I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention, as defined in the appended claims.

Having thus fully described my invention, what I claim as new and desire to secure by Letters Patent is:—

1. In a sharpening device constructed for use in connection with a lawn mower comprising a bed knife and a blade movable into coöperation with said bed knife; the combination of a bar provided with handles and with a guide between said handles, an abrasive element, and means coöperative with said guide for guiding said blade with respect to said bed knife when said guide is moved along the said bed knife, while in contact therewith, by means of said handles.

2. In a sharpening device constructed for use in connection with a lawn mower comprising a bed knife, a brace rod, and a blade movable into coöperation with said bed knife; the combination of a bar provided with a guide, a support adapted for connection with said brace rod, a guide carried by said support, an abrasive element carried by said bar, and a guide adjacent to said abrasive element and coöperative with the first and second said guides and with said bed knife for guiding said blade with respect to said bed knife while the first said guide is in contact with said bed knife and being moved therealong and while said blade is in contact with said abrasive element.

3. In a sharpening device constructed for use in connection with a lawn mower comprising a bed knife, and a blade movable into coöperation with said bed knife; the combination of a bar provided with a guide designed to be in contact with the cutting edge of said bed knife and to move along said cutting edge, a guide movably secured to said bar and designed to travel upon the upper surface of said bed knife when the first said guide is moved along said cutting edge, means for adjusting said guide element with relation to said bar, and an abrasive element carried by said bar and being in contact with said blade while said bar is moved along said cutting edge.

4. In a sharpening device constructed for use in connection with a lawn mower comprising a bed knife, and a blade movable into coöperation with said bed knife; the combination of a bar provided with a guide designed to be in contact with the cutting edge of said bed knife and to move along said cutting edge, a guide movably secured to said bar and designed to travel upon the upper surface of said bed knife when the first said guide is moved along said cutting edge, means for adjusting said guide element with relation to said bar, an abrasive element carried by said bar, and independent guide means coöperating with said bar to properly position the same in conjunction with the remaining guide means.

5. In a sharpening device constructed for use in connection with a lawn mower comprising a bed knife, a blade movable into coöperation with said bed knife, and a brace rod; the combination of a bar provided with a guide designed to be in contact with said bed knife and to travel therealong, a support designed to be engaged with said brace rod, a second guide carried by said bar, means for allowing adjustment of the second guide and for retaining it in an adjusted position, an abrasive element carried by said bar and designed to be in contact with said blade, and means coöperative with the first and second said guides for guiding said blade with respect to said bed knife when said bar is caused to move along the said bed knife while said blade is in contact with said abrasive element.

In testimony whereof I affix my signature in presence of two witnesses.

CHARLES S. SAYRE.

Witnesses:
ADA E. DAVIS,
D. W. NORTH.

Copies of this patent may be obtained for five cents each, by addressing the "Commissioner of Patents, Washington, D. C."